United States Patent [19]

Dupin

[11] 4,174,698
[45] Nov. 20, 1979

[54] IN-LINE TWO-CYLINDER ENGINE

[75] Inventor: Jean G. A. Dupin, Versailles, France

[73] Assignee: Societe Anonyme Automobiles Citroen, Paris, France

[21] Appl. No.: 820,242

[22] Filed: Jul. 29, 1977

[30] Foreign Application Priority Data

Aug. 5, 1976 [FR] France ............................... 76 24003

[51] Int. Cl.$^2$ ............................................. F16F 15/26
[52] U.S. Cl. ............................ 123/192 B; 123/192 R; 74/604
[58] Field of Search ...................... 123/192 B, 192 R; 74/604

[56] References Cited

U.S. PATENT DOCUMENTS

| 1,163,832 | 12/1915 | Lanchester | 123/192 B |
| 2,304,892 | 12/1942 | Dickson | 74/604 |
| 3,759,238 | 9/1973 | Irgens | 74/604 |
| 3,800,625 | 4/1974 | Seino et al. | 123/192 B |

FOREIGN PATENT DOCUMENTS

| 2147213 | 4/1973 | Fed. Rep. of Germany. | |
| 382263 | 2/1908 | France. | |
| 1106744 | 7/1955 | France | 123/192 B |
| 2279982 | 2/1975 | France. | |

Primary Examiner—Charles J. Myhre
Assistant Examiner—Jeffrey L. Yates
Attorney, Agent, or Firm—Stevens, Davis, Miller & Mosher

[57] ABSTRACT

An in-line, two-cylinder engine comprises a crankshaft having crankpins at a 360° setting and balancing means comprising a first counterweight rotating oppositely to, but at the same speed as, the crankshaft, such counterweight being so set that its center of gravity is remote from the crankpins when the pistons are at top dead center, such first counterweight being of a size and design such as to develop a centrifugal force whose amplitude is half the maximum amplitude of the reciprocating rectilinear inertia forces of the engine.

Means are provided for compensating for the resultant of the centrifugal force of the first counterweight and of the reciprocating rectilinear inertia forces, such provision comprising at least one second counterweight rotating in the same direction and at the same speed as the crankshaft and adapted to produce a compensating force whose direction always passes through a point disposed in the central plane of the engine and symmetrical of the center of rotation of the first counterweight relative to the plane defined by the cylinder axes.

11 Claims, 5 Drawing Figures

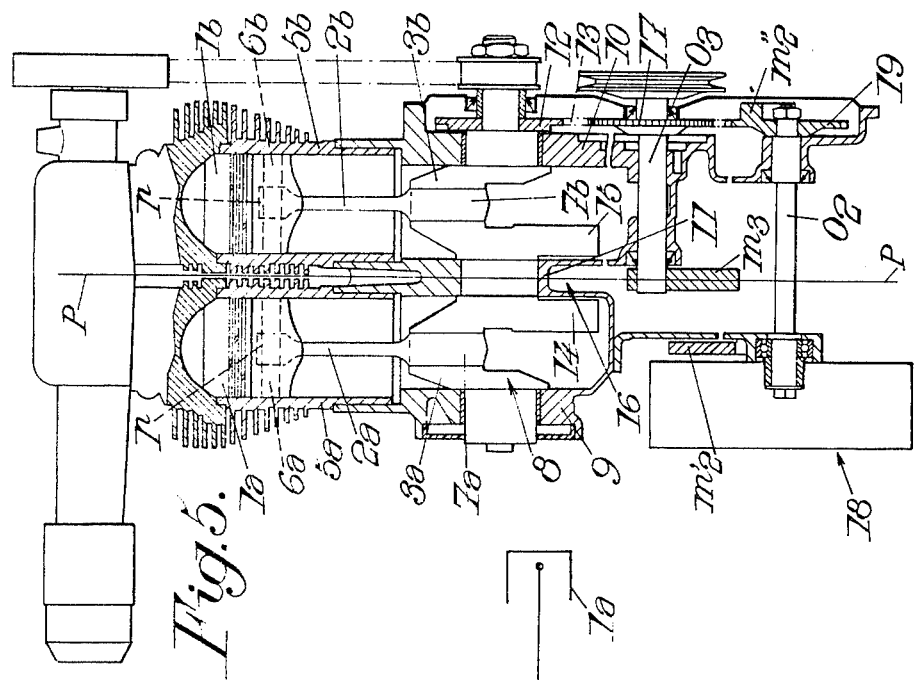
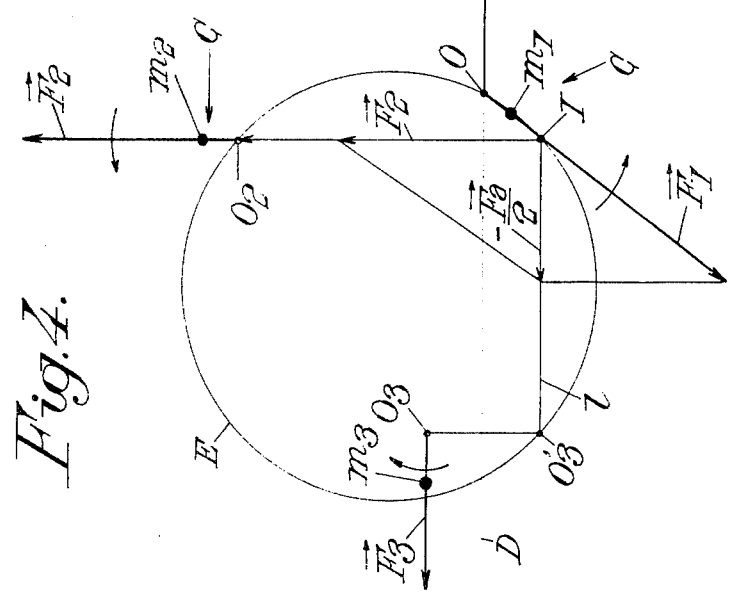

IN-LINE TWO-CYLINDER ENGINE

BACKGROUND OF THE INVENTION

This invention relates to an in-line two cylinder engine of the kind comprising a crankshaft having crankpins to which the ends of connecting rods connected to the pistons are articulated, the crank pins being set at 360°, the engine having perpendicular to the crankshaft axis a central plane in which lies the resultant of the reciprocating inertia forces to be balanced, the engine also having balancing means in the form of a first counterweight rotatable around a rotational axis parallel to the crankshaft in the opposite direction to, but at the same speed as, the crankshaft, the crankshaft being so set that its centre of gravity is remote from the crank pins when the pistons are at top dead centre, the centre of gravity of the counterweight being disposed in the central plane of the engine, the first counterweight being of a size and construction such as to develop a centrifugal force whose amplitude is half the maximum amplitude of the reciprocating rectilinear inertia forces of the engine, the rotational axis of the first counterweight being disposed outside the plane defined by the axes of the cylinders.

It is an object of the invention to improve the practical performance of such engines, inter alia to improve their balancing, to simplify the balancing means and to improve the accuracy of the various settings or adjustments determining the effectiveness of the balancing.

SUMMARY OF THE INVENTION

According to the invention, an engine of the kind defined above comprises means for compensating for the resultant of the centrifugal force of the first counterweight and of the reciprocating rectilinear inertia forces of the engine, such compensating means comprising at least one second counterweight rotatable in the same direction and at the same speed as the crankshaft and adapted to produce a compensating force which always passes through a point disposed in said central plane of the engine symmetrical of the axis of rotation of the first counterweight relative to the plane defined by the cylinder axes, the compensating force so opposing such resultant as to cancel out the same.

The compensating means may comprise a single second counterweight which is so set that its centre of gravity is opposite the crank pins and is disposed in the central plane of the engine, the second counterweight being rotatable around a point disposed in the latter plane symmetrically relative to the plane of the cylinder axes, of the centre of rotation of the first counterweight, the second counterweight being of a size and construction to develop a centrifugal force of half the maximum amplitude of the reciprocating inertia forces of the engine.

The second counterweight may be in the form of a single weight whose centre of gravity is disposed in the central plane of the engine; in this case, no weight acting as a counterweight is provided on the crankshaft.

The second counterweight can take the form of a system of a plurality of weights rotatable around parallel axes and so set that the centre of gravity of the system is disposed opposite the crank pins, the weights rotating in the same direction and at the same speed as the crankshaft, the centres of rotation of the weights being aligned with the point which lies in the central plane of the engine and is symmetrical of the centre of rotation of the first counterweight. The resultant of the forces developed by the weights is equal to half the maximum amplitude of the reciprocating inertia forces of the engine and passes through the point symmetrical of the centre of rotation of the first counterweight. One of the weights can be provided on the engine flywheel and the other on the distribution side—i.e., the camshaft drive side.

The compensating means may comprise two second counterweights rotatable in the same direction and at the same speed as the crankshaft and having their centres of gravity disposed in the engine centre-plane, one of the second counterweights being carried by the crankshaft, the other being rotatable around an axis parallel to the crankshaft, the two second counterweights being so set and being of a size and construction such as to provide complete balancing of the engine.

The setting and the size and construction of the counterweight are devised as follows:

As regards the angular setting or adjustment, when the pistons are at top dead-centre the directions of the centrifugal forces developed by the two second counterweights must pass through a point disposed at the intersection of (1) a circle which is disposed in the central plane of the engine and passes through the crankshaft axis, the centre of rotation of one of the second counterweights and the point which is symmetrical, relative to the plane of the piston axes, of the centre of rotation of the first counterweight and (2) the straight line disposed in the engine centre-plane and passing through the last-mentioned point and parallel to the cylinder axes.

After the angular setting has been dealt with as just outlined, the two second counterweights are so dimensioned that, when the pistons are at top dead centre, the resultant of the centrifugal forces developed by the two second counterweights is oppositely directed to the reciprocating inertia force of the engine and has an amplitude equal to half the maximum amplitude of the last-mentioned force.

According to another aspect of the invention, there is provided an in-line two-cylinder engine comprising a crankshaft having crank pins to which the ends of connecting rods are articulated, the crank pins being set at 360°, the engine having perpendicular to the crankshaft axis, a central plane in which lies the resultant of the reciprocating inertia forces to be balanced, the engine also having balancing means for the inertial forces in the form of a number of rotating counterweights, in which engine each counterweight is carried on a shaft and takes the form of a number of weights equivalent to a single weight whose centre of gravity is disposed in the central plane of the engine, the arrangement being such that all the weights are in different planes. Two weights can therefore never be disposed in the same plane and so there is no risk of the circular paths of the weights interfering with one another.

This feature is very advantageous when the counterweights are rotatated by flexible means such as a chain cooperating with gearwheels or a toothed belt.

Preferably, the first counterweight rotating in the opposite direction to the crankshaft is disposed in the central plane of the engine, whereas a second counterweight carried by the crankshaft takes the form of a number of weights (2 or 4 weights) disposed symmetrically of the central plane engine centre-plane, a further second counterweight taking the form of asymmetrical weights rotating around a third axis parallel to the crankshaft, the centre of gravity of the asymmetrical weights being disposed in the central plane of the engine.

BRIEF DESCRIPTION OF THE DRAWINGS

In order that the invention may be readily understood, embodiments thereof will now be described, by way of example, with reference to the accompanying drawings, in which:

FIG. 4 is a diagram explaining the balancing of a two-cylinder engine according to the invention, with three counterweights whose centres of gravity are disposed in the central plane of the engine, one of the counterweights being mounted on the crankshaft; and FIG. 5 is a section on offset lines through a two-cylinder engine balanced in accordance with the invention.

DESCRIPTION OF PREFERRED EMBODIMENTS

Figure 1:
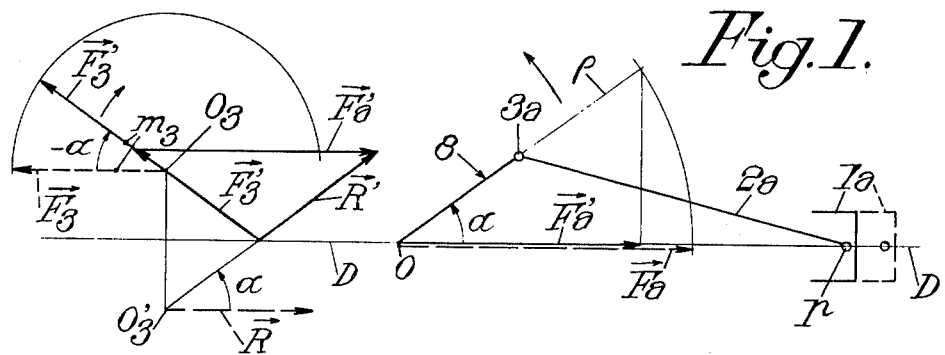
FIG. 1 is a theoretical diagram explaining the balancing of an engine according to the invention.

Referring to FIG. 1, there can be seen in diagrammatic form a piston 1a connected by a rod 2a to a crankpin 3a of a crankshaft 8 of an in-line two-cylinder engine. The crankpins 3a are at a 360° setting. The crankshaft axis intersects the plane of FIG. 1 at a point 0. The plane of FIG. 1 corresponds to the central plane P of the engine in which lies the resultant of the reciprocating rectilinear inertia forces on the rectilinearly moving engine masses. The latter masses are mainly the pistons and the connecting-rod small ends p.

It will be assumed that the rotating masses of the engine such as the crankshaft and the big ends are already in a state of balance.

The reciprocating inertia force reaches its peak at the top dead centre position of the pistons 1. The peak is represented by a chain-line vector $\vec{F}_a$.

When the crank pin 3a has rotated through an angle $\alpha$, the amplitude of the reciprocating inertia force has decreased; the inertia force corresponding to this position of the crankpin 3a is represented by a vector $\vec{F}'a$ of an amplitude equal to the projection, on the straight line D in the plane defined by the engine cylinder axes, of a radius P which coincides in direction wth the crankpin 3a and whose length is equal to the amplitude of the vector $\vec{F}a$. It is therefore possible to state: $F'a = Fa \cos\alpha$.

The engine has a balancing means in the form of a first counterweight m3 rotatable around an axis 03 parallel to the crankshaft in the opposite direction but at the same speed as the crankshaft. The axis 03 is disposed outside the plane of the cylinder axes.

The counterweight m3 has its centre of gravity in the central plane of the engine; in FIG. 1 the counterweight m3 is diagrammatically shown as a point m3 rotating clockwise around axis 03, the crankshaft rotating anticlockwise.

The counterweight m3 is set angularly so that its centre of gravity is in the direction away from the crankpin 3a when the piston 1a is at its top dead centre position. In the case shown in FIG. 1, when the pistons are at top dead centre, the crankpin 3a is disposed to the right of the crankshaft rotational axis O; the counterweight m3 is so set or adjusted that its centre of gravity is to the left of the axis 03 and on a straight line passing therethrough and parallel to D.

The centrifugal force developed by the counterweight m3 is represented by a vector which, with the pistons at top dead centre, corresponds to F3 in FIG. 1. The counterweight m3 is devised to develop a centrifugal force whose amplitude is half the amplitude of $\vec{F}a$. Consequently the length of the vector $\vec{F}3$ is half the length of the vector $\vec{F}a$. The end of the vector $\vec{F}3$ describes a circle clockwise.

In FIG. 1 there can be seen a vector $\vec{F}'3$, corresponding to the centrifugal force developed by the weight m3 when the crankpin has rotated through an angle $\alpha$ around O.

The resultant of the centrifugal force $\vec{F}3$ of the counterweight m 3 and of the reciprocating rectilinear forces $\vec{F}a$ of the engine is represented by the vector $\vec{R}$ when the pistons are at top dead centre.

The resultant $\vec{R} = \vec{F}3 + \vec{F}a$ is half as long as $\vec{F}a$ and extends in the same direction as $\vec{F}a$.

Also, the resultant $\vec{R}$ passes through the point O'3 which is in the central plane of the engine and is symmetrical with respect to the axis of rotation O3 of the counterweight m 3 relative to the straight line D and therefore relative to the plane of the cylinder axes. The resultant $\vec{R}$ rotates in the same direction as the crankshaft and at the same angular velocity as the crankshaft.

When the engine rotates and the counterweight m3 rotates in the opposite direction, the resultant is a rotating vector which has a constant amplitude Fa/2 and which always passes through the point O'3.

The resultant $\vec{R}'$ of the forces $\vec{F}'a$ and $\vec{F}'3$ for a rotation of the crankshaft through an angle $\alpha$ from the top dead centre position is shown in FIG. 1. So far as amplitude and moment relative to any point are concerned, the resultant $\vec{R}, \vec{R}'$ is equal to the two forces ($\vec{F}a, \vec{F}3$) or ($\vec{F}'a, \vec{F}'3$). The engine has compensating means C, shown in FIGS. 2-5, to compensate for the resultant $\vec{R}, \vec{R}'$ of the centrifugal force $\vec{F}3, \vec{F}'3$ and of the reciprocating rectilinear inertia forces $\vec{F}a, \vec{F}'a$.

The means C comprises at least one second counterweight 4 rotating in the same direction and at the same speed as the crankshaft. The means C is adapted to produce a compensating force which always passes through the point O'3 and which opposes the resultant $\vec{R}, \vec{R}'$ so as to cancel the same.

Figure 2:
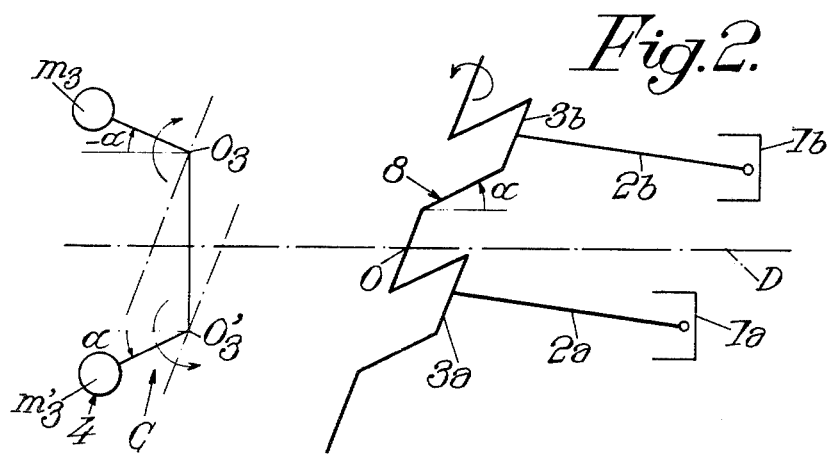
FIG. 2 is a diagram showing a two-cylinder engine balanced by two counterweights.

In the embodiment shown in FIG. 2, the compensating means C comprises a single second counterweight 4 embodied by a single weight m'3 whose centre of gravity lies in the central plane of the engine and which is so set that its centre of gravity is disposed opposite the crank pins 3a, 3b in the sense hereinbefore described. The weight m'3 is rotated by appropriate means around the point O'3 at crankshaft speed. The weight m'3 is devised to develop a centrifugal force whose amplitude is half the peak amplitude Fa. Consequently the mass m3 develops a force directly opposed to the resultant $\vec{R}, \vec{R}'$ of FIG. 1, thus providing complete engine balancing.

In a variant, the counterweight 4 can be embodied by a system consisting of two weights m'1, m'2 rotating around axes parallel to the crankshaft. The latter weights are set at angles such that their centre of gravity is disposed opposite the crankpins 3a, 3b. The weights m'1, m'2 rotate in the same direction and at the same speed as the crankshaft and their rotational centres O'1, O'2—i.e., the points of intersection between the axes of rotation of the weights and the planes passing through their centre of gravity and perpendicular to the crankshaft axis—are aligned with the point O'3.

The weights m'1, m'2 are of a size and construction such that the resultant of the centrifugal forces which they develop passes through the point O'3 and is opposed to the resultant $\vec{R}$, $\vec{R}'$.

Figure 3:
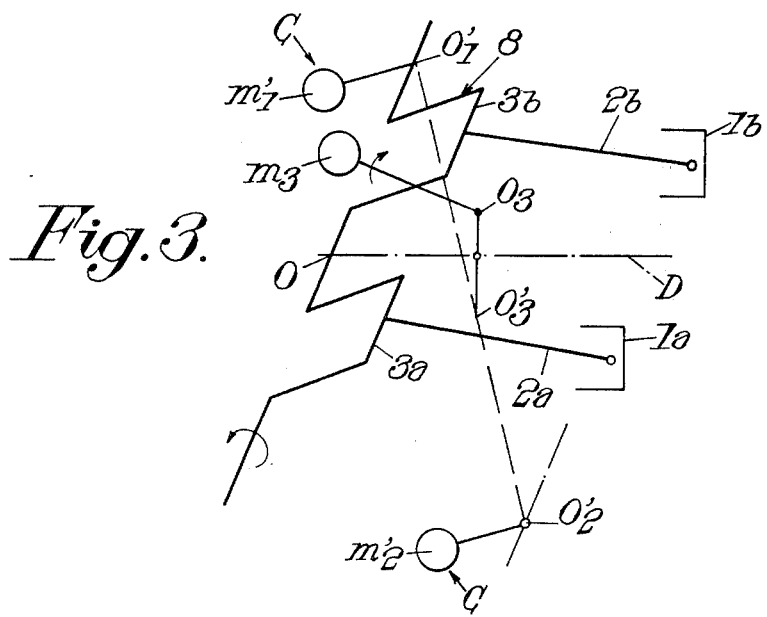
FIG. 3 is a diagram showing a variant of the balancing shown in FIG. 2.

The weight m'1 can be disposed for example on the engine flywheel so as to rotate around the crankshaft axis of rotation while being eccentric thereof, in the manner shown diagrammatically in FIG. 3, and the other weight m'2 can be placed on the other side of the engine or on the distribution side—i.e., the side where the drive for the camshaft is disposed.

In another embodiment, shown diagrammatically in FIG. 4, the compensating means C comprises two second counterweights m1, m2 rotating in the same direction and at the same speed as the crankshaft and having their centres of gravity disposed in the engine centreplane. The counterweight m1 is carried by the crankshaft and therefore rotates around the crankshaft axis O; the counterweight m1 is represented diagrammatically in FIG. 4 by its centre of gravity rotating around O and being eccentric thereof.

The counterweight m2 rotates around an axis parallel to the crankshaft and intersecting the central plane of the engine at the point O2. The counterweight m2 is represented diagrammatically in FIG. 4 by its centre of gravity which rotates eccentrically around the centre of rotation O2.

The vector $\vec{F}1$ in FIG. 4 represents the centrifugal force developed by the weight m1 at the top dead centre position of the pistons and the vector $\vec{F}2$ represents the centrifugal force developed by the weight m2 at the top dead centre position of the pistons.

The counterweights m1, m2 are set at angles such that the vectors $\vec{F}1$ and $\vec{F}2$ pass through an intersection point I between a circumference E passing through the points O, O2 and O'3 (bearing in mind that, as previously described, O'3 is the point which is symmetrical of O3 relative to D), and the straight line l parallel to D and passing through O'3.

The weights m1, m2 are such that the resultant of the forces $\vec{F}1$ and $\vec{F}2$ lies in a direction passing through point O'3 and is equal to $-\vec{F}a/2$.

FIG. 4 shows the vectors $\vec{F}1$ and $\vec{F}2$ satisfying these conditions.

The angular setting of the weights m1, m2 and their value are therefore completely determined in a simple and rapid manner. As the engine rotates the resultant of the centrifugal forces developed by the weights m1, m2 always passes through the point O'3 and has a constant amplitude. This resultant provides a permanent balancing of the resultant $\vec{R}$, $\vec{R}'$ of the forces ($\vec{F}3$, $\vec{F}a$) and ($\vec{F}'3$, $\vec{F}'a$) (see FIG. 1).

FIG. 5 shows a practical embodiment of an engine having a balancing system according to the invention, more particularly of the kind shown in FIG. 4. The engine has two in-line cylinders 5a, 5b whose axes are parallel to one another. A piston 1a, 1b reciprocates rectilinearly in each cylinder. The crankpins 3a, 3b are set at 360° so that the pistons move together. The little ends 2a, 2b are connected to the pistons by pins 6a, 6b and the big ends 7a, 7b are articulated to the crank pins.

The crank shaft 8 is mounted in two end bearings 9,10 and an intermediate bearing 11 symmetrical of the central plane P. Rotating solidly with the crankshaft 8 at the right-hand end thereof in FIG. 5 is a gearwheel 12 driving a chain 13 shown in diagrammatic form. The counterweight m1 on the crankshaft takes the form of a system of two eccentric weights 14, 15 symmetrically arranged relative to the central plane P of the engine.

Alternatively, the crankshaft counterweight m1 can be broken down into four eccentric weights forming a system which is symmetrical relative to the central plane P.

The counterweight m3 is disposed on an intermediate shaft O3 parallel to the crankshaft and takes the form of a weight which is eccentric of the shaft O3 and whose centre of gravity is disposed in the central plane P. The weight m3 is received longitudinally between the opposite surfaces of crankshaft webs 14 and 15.

Advantageously, the engine block has a re-entrant part 16 between the planes of the inside surfaces of the webs 14 and 15; the rotating weight m3 passes through the volume outside the engine block bounded by the part 16.

Preferably, the shaft O3 for the weight m3 is the oil pump shaft and the same is rotated by a gearwheel 17 rotating solidly with such shaft and co-operating with the chain driven by the crankshaft gear 12. However, the gear 17 co-operates with the chain surface opposite to the surface co-operating with the gear 12 so that the shaft O3 rotates in the opposite direction to the crankshaft 8. The gears 17 and 12 are both of the same diameter.

Advantageously the counterweight m2 is disposed on the shaft O2 of some other auxiliary rotating element 18 of the engine. The element 18 is shown in very schematic form in FIG. 5 and is disposed at one end of shaft O2. The counterweight m2 is made up of two elementary weights m'2, m"2. The weight m'2, which is eccentric of the shaft O2, is secured to a part of the element 18, as can be seen in FIG. 5. The weight m"2 takes the form of an eccentric widening of the gear 19 rotating the shaft O2. The gear 19 is disposed at the other end of shaft O2 and coplanar with the gears 12 and 17 and is rotated by the chains 13 which co-operate with the gears 12, 17. The gear 19 co-operates with the same chain surface as does the gear 12 and therefore rotates in the same direction as the crankshaft. The gears 19 and 12 are of the same diameter as one another.

The asymmetric weights m'2, m"2 are equivalent to a single weight whose centre of gravity would be disposed in the central plane P. The webs and weights 14, 15, m3, m2, m"2 are disposed in different planes and move along paths which do not interfere with one another.

Consequently, should the chain (or other flexible means, such as a toothed belt, used to rotate the weights) break, there is no risk of the various weights colliding with one another.

FIG. 5 is a view of the engine in section on a number of offset lines, for the shaft O3 or, more accurately, its geometric axis, lies outside the plane of the axes of the cylinders 1a, 1'. Also, the plane passing through the geometric axes of the shafts O2, O3 is not parallel to the plane of the cylinder axes. These remarks are merely consequences which can be gathered from the description referring to FIG. 4.

The shaft receiving the balancing counterweights, such as the oil pump shaft etc., can be chosen optimally, for the angular setting of the counterweights fitted to the shafts and the dimensions and weights of the counterweights can always be determined rapidly and accurately, as explained inter alia with reference to FIG. 4.

The invention therefore provides satisfactory balancing of a two-cylinder engine with the counterweight centres of gravity arranged in the plane of the engine.

I claim:

1. A two-cylinder engine comprising:
   first and second cylinders arranged in line;
   first and second pistons received in said first and second cylinders respectively for reciprocation therein;
   a crankshaft having first and second crankpins set at 360°;
   first and second connecting rods connecting said first and second pistons to said first and second crankpins respectively, said crankshaft having an axis perpendicular to a central plane of the engine in which lies the resultant of the reciprocating inertia forces to be balanced, said crankshaft being set so that its centre of gravity is remote from said crankpins when said pistons are at top dead centre; and
   balancing means in the form of a first counterweight rotatable about an axis of rotation parallel to said crankshaft in the opposite direction to but at the same speed as said crankshaft, the centre of gravity of said first counterweight lying in said central plane of the engine, said first counterweight being of a size and construction such as to develop a centrifugal force having an amplitude which is half the maximum amplitude of the reciprocating rectilinear inertia forces of the engine, said axis of rotation of said first counterweight being disposed outside the plane defined by the axes of said first and second cylinders;
   the engine being characterized by:
   means for compensating for the resultant of the centrifugal force of said first counterweight and of the reciprocating rectilinear inertia forces of the engine, said compensating means comprising at least one second counterweight rotatable in the same direction and at the same speed as said crankshaft, said compensating means being adapted to produce a compensating force which always passes through a point disposed in said central plane of the engine symmetrically of the axis of rotation of said first counterweight relative to the plane defined by the axes of said first and second cylinders, the compensating force so opposing the resultant as to cancel out the latter.

2. An engine as claimed in claim 1, wherein said compensating means comprises a second counterweight which is so set that its centre of gravity is opposite said crank pins, the centre of gravity of said second counterweight being disposed in said central plane of the engine and being rotatable around a point which is disposed in the latter plane symmetrically relative to the plane of said cylinder axes, of the rotational centre of said first counterweight, said second counterweight being of a size and construction to develop a centrifugal force of half the maximum amplitude of the reciprocating inertia forces of the engine.

3. An engine as claimed in claim 2, wherein said second counterweight is in the form of a single weight having its centre of gravity disposed in said central plane of the engine and which is adapted to rotate around the point symmetrical of the centre of gravity of said first counterweight.

4. An engine as claimed in claim 2, wherein said second counterweight comprises a system of at least two weights rotatable around parallel axes and so set that the centre of gravity of the system of weights is disposed opposite said crankpins, the weights of said system rotating in the same direction and at the same speed as said crankshaft, the centres of rotation of the weights of said system being aligned with the point which lies in said central plane of the engine and is symmetrical of the centre of rotation of said first counterweight.

5. An engine as claimed in claim 4, wherein one of the weights forming part of said system of weights is disposed on the engine flywheel and the other weight of said system is disposed on the distribution side.

6. An engine as claimed in claim 1, wherein said compensating means comprises two second counterweights rotating in the same direction and at the same speed as said crankshaft and having their centres of gravity disposed in said central plane of the engine, one of said second counterweights being carried by said crankshaft and the other being rotatable around an axis parallel to said crankshaft, said two second counterweights being so set and being of a size and design such as to provide complete balancing of the engine.

7. An engine as claimed in claim 6, wherein: said second counterweights are so set that, when said pistons are at top dead centre, the directions of the centrifugal forces developed by said two second counterweights pass through a point disposed at the intersection of a circle in said central plane of the engine and passing through the crankshaft axis, the centre of rotation of one of said second counterweights and the point which is symmetrical, relative to the plane of the axes of said pistons, of the centre of rotation of said first counterweight, and the straight line in said central plane of the engine passing through the last-mentioned point and parallel to the cylinder axes; and said two second counterweights are so dimensioned that, when the pistons are at top dead centre, the resultant of the centrifugal forces developed by said second counterweights is oppositely directed to the reciprocating inertia force of the engine and has an amplitude equal to half the maximum amplitude of the last-mentioned force.

8. An engine as claimed in claim 1, wherein:
   each of the counterweights is carried on a shaft, and all of the counterweights are in different planes thereby avoiding interference between the circular paths of said counterweights.

9. An engine as claimed in claim 8, comprising a first shaft parallel to said crankshaft and outside the plane defined by the axes of said cylinders, said first shaft being rotatable in the opposite direction to said crankshaft, and a second shaft parallel to said crankshaft and rotatable in the same direction as said crankshaft, said first counterweight being carried by said first shaft and disposed in said central plane of the engine, said second counterweight being carried by said crankshaft and comprising a plurality of weights distributed symmetrically with respect to said central plane of the engine, and a third counterweight carried by a third shaft parallel to said crankshaft and comprising asymmetrical weights having a centre of gravity disposed in the said central plane of the engine.

10. An engine as claimed in claim 9, wherein said first shaft is the shaft of an oil pump of the engine and said third shaft is the drive shaft of an auxiliary element of the engine.

11. An engine as claimed in claim 10, wherein said third shaft has a shaft-driving gearwheel thereon at one end, said asymmetrical weights comprising said third counterweight comprising one weight disposed on said shaft-driving gearwheel at the one end of said third shaft and another weight secured to the auxiliary element at the other end of said third shaft.

* * * * *